(12) United States Patent
Kanamarlapudi et al.

(10) Patent No.: US 9,521,655 B2
(45) Date of Patent: Dec. 13, 2016

(54) METHOD AND APPARATUS FOR AVOIDING POWER SCALING IN UPLINK DATA TRANSMISSION

(71) Applicant: QUALCOMM Incorporated, San Diego, CA (US)

(72) Inventors: Sitaramanjaneyulu Kanamarlapudi, San Diego, CA (US); Sharif Ahsanul Matin, San Diego, CA (US); Nate Chizgi, Sunnyvale, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 14/191,251

(22) Filed: Feb. 26, 2014

(65) Prior Publication Data

US 2015/0036668 A1    Feb. 5, 2015

Related U.S. Application Data

(60) Provisional application No. 61/862,269, filed on Aug. 5, 2013, provisional application No. 61/860,064, filed on Jul. 30, 2013.

(51) Int. Cl.
*H04W 84/12* (2009.01)
*H04W 72/02* (2009.01)
(Continued)

(52) U.S. Cl.
CPC ........... *H04W 72/02* (2013.01); *H04W 52/146* (2013.01); *H04W 52/281* (2013.01);
(Continued)

(58) Field of Classification Search
CPC .. H04W 84/18; H04W 84/12; H04W 72/0446; H04W 52/281; H04W 52/346; H04W 52/34; H04W 56/0045
See application file for complete search history.

(56) References Cited

U.S. PATENT DOCUMENTS

| 7,831,271 | B2 | 11/2010 | Baker et al. |
| 8,699,447 | B2 * | 4/2014 | Ranta-Aho ........... H04L 5/0007 370/330 |

(Continued)

FOREIGN PATENT DOCUMENTS

| EP | 1531557 A2 | 5/2005 |
| WO | WO 2011-008023 | 1/2011 |

OTHER PUBLICATIONS

Nokia: "UE maximum power reduction when HS-DPCCH is transmitted," TSG-RAN meeting # 23, RP-040113, Mar. 10-12, 2004, Phoenix, Arizona, US, 8 pages.

(Continued)

*Primary Examiner* — Hassan Phillips
*Assistant Examiner* — Prenell Jones
(74) *Attorney, Agent, or Firm* — Loza & Loza LLP

(57) ABSTRACT

Methods and apparatus for avoiding power scaling and controlling transmit power in uplink data transmission are provided. If a user equipment (UE) would be transmit-power limited when transmitting data concurrently on an uplink high speed dedicated physical control channel (HS-DPCCH) and an uplink data channel, the UE may forgo building data for transmission on the uplink data channel to avoid power scaling. If the UE would be transmit-power limited when transmitting data concurrently on an HS-DPCCH and a dedicated physical control channel (DPCCH), the UE may reduce the transmission power of a portion of the data transmitted on the DPCCH to avoid power scaling. The UE may also boost transmission power of a negative acknowledge transmission above network-specified power level.

26 Claims, 13 Drawing Sheets

(51) Int. Cl.
  *H04W 52/14* (2009.01)
  *H04W 52/34* (2009.01)
  *H04W 52/28* (2009.01)
  *H04W 52/36* (2009.01)
  *H04W 52/48* (2009.01)

(52) U.S. Cl.
  CPC ......... *H04W 52/34* (2013.01); *H04W 52/367* (2013.01); *H04W 52/48* (2013.01); *Y02B 60/50* (2013.01)

(56) References Cited

U.S. PATENT DOCUMENTS

| | | | |
|---|---|---|---|
| 8,948,158 B2 * | 2/2015 | Cai | H04L 5/0053 370/336 |
| 8,964,683 B2 * | 2/2015 | Dinan | H04W 56/0005 370/329 |
| 9,008,050 B2 * | 4/2015 | Feuersanger | H04W 52/281 370/336 |
| 9,031,600 B2 * | 5/2015 | Pelletier | H04W 52/367 455/127.1 |
| 2007/0030828 A1 * | 2/2007 | Vimpari et al. | 370/335 |
| 2009/0290559 A1 * | 11/2009 | Pelletier | H04L 1/189 370/336 |
| 2009/0290599 A1 * | 11/2009 | Taki | 370/474 |
| 2010/0322090 A1 | 12/2010 | Zhang et al. | |
| 2011/0026419 A1 | 2/2011 | Kim et al. | |
| 2011/0171991 A1 * | 7/2011 | Liu et al. | 455/522 |
| 2011/0243088 A1 * | 10/2011 | Ahn | H04L 1/0023 370/329 |
| 2012/0082192 A1 * | 4/2012 | Pelletier et al. | 375/219 |
| 2012/0083264 A1 * | 4/2012 | Ramasamy | H04W 52/262 455/425 |
| 2012/0114577 A1 * | 5/2012 | Chung | A61K 8/64 424/62 |
| 2012/0202542 A1 * | 8/2012 | Dimou | H04W 24/02 455/509 |
| 2013/0021915 A1 | 1/2013 | Catovic et al. | |
| 2013/0022028 A1 * | 1/2013 | Niwano | 370/335 |
| 2013/0058315 A1 * | 3/2013 | Feuersanger | H04W 52/281 370/336 |
| 2013/0072208 A1 * | 3/2013 | Marinier et al. | 455/450 |
| 2013/0170443 A1 | 7/2013 | He et al. | |
| 2013/0250892 A1 | 9/2013 | Zhang et al. | |
| 2013/0250975 A1 * | 9/2013 | Ahn | H04N 21/23605 370/474 |
| 2014/0029586 A1 * | 1/2014 | Loehr | H04W 56/0005 370/336 |
| 2014/0146777 A1 * | 5/2014 | Shin | H04W 52/32 370/329 |
| 2014/0153500 A1 * | 6/2014 | Duan et al. | 370/329 |
| 2014/0226516 A1 * | 8/2014 | Hwang | H04L 5/001 370/252 |
| 2015/0163754 A1 * | 6/2015 | Konuskan et al. | 455/522 |
| 2015/0201326 A1 * | 7/2015 | Kazmi et al. | 370/329 |

OTHER PUBLICATIONS

International Search Report and Written Opinion—PCT/US2014/048207—ISA/EPO—Sep. 30, 2014.

* cited by examiner

METHOD AND APPARATUS FOR AVOIDING POWER SCALING IN UPLINK DATA TRANSMISSION

CROSS-REFERENCE TO RELATED APPLICATIONS

This application claims priority to and the benefit of provisional patent application No. 61/862,269 filed in the U.S. Patent Office on 5 Aug. 2013, and provisional patent application No. 61/860,064 filed in the U.S. Patent Office on 30 Jul. 2013, the entire content of both applications are incorporated herein by reference.

TECHNICAL FIELD

Aspects of the present disclosure relate generally to wireless communication systems, and more particularly, to uplink power control at a wireless communication device.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. In a UMTS network, a wireless user equipment (UE) may have the capability of transmitting a minimum set of transport format combinations (TFCs) or a minimum set of enhanced transport format combinations (E-TFCs) in the uplink transmission. These minimum sets are described in detail in 3GPP Technical Specification (TS) 25.331. The UE may be configured to transmit both minimum sets (TFCs and E-TFCs) in a multiple radio access bearers (Multi-RAB) mode. According to 3GPP TS 25.214, when the total transmit power of the UE exceeds a maximum allowed value, which may be determined by the network, the UE applies power scaling so that the total transmit power is equal to or less than the maximum allowed power, in order to support the minimum sets of TFC/E-TFC data in addition to the transmission on the uplink high speed dedicated physical control channel (HS-DPCCH).

Due to the power scaling, there is a possibility that the data of the HS-DPCCH is not decoded reliably on the network side (receiving end). For example, if the hybrid automatic repeat request (HARQ) acknowledgement (ACK) is decoded as a discontinuous transmission (DTX), the network might end up retransmitting the data, which will be decoded as duplicate data and discarded by the UE. This will result in sub-optimal usage of the radio resources, and degraded effective data throughput at the UE, which is already operating in peak power range. In another scenario, if the HARQ negative ACK (NAK) is decoded as an ACK, the network might end up transmitting new data, which will result in discarding the previous HARQ transmission time interval (TTI) data at the UE.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communications operable at a user equipment (UE). The method determines that first data is scheduled for transmission in an uplink high speed dedicated physical control channel (HS-DPCCH) in a transmission time interval (TTI). The method further determines that second data is scheduled for transmission in an uplink data channel in the TTI. If the UE would be transmit-power limited when transmitting the first data and second data concurrently, the method forgoes building the second data for transmission during the TTI.

Another aspect of the disclosure provides an apparatus for wireless communications. The apparatus includes means for determining that first data is scheduled for transmission in an uplink high speed dedicated physical control channel (HS-DPCCH) in a transmission time interval (TTI), and means for determining that second data is scheduled for transmission in an uplink data channel in the TTI. The apparatus further includes means for if the apparatus would be transmit-power limited when transmitting the first data and second data concurrently, forgoing building the second data for transmission during the TTI.

Another aspect of the disclosure provides a computer-readable medium including code for operating a user equipment (UE). The code includes a first routine for determining that first data is scheduled for transmission in an uplink high speed dedicated physical control channel (HS-DPCCH) in a transmission time interval (TTI), and a second routine for determining that second data is scheduled for transmission in an uplink data channel in the TTI. The code further includes a third routine for if the UE would be transmit-power limited when transmitting the first data and second data concurrently, forgoing building the second data for transmission during the TTI.

Another aspect of the disclosure provides an apparatus for wireless communication. The apparatus includes at least one processor, a communication interface coupled to the at least one processor, and a memory coupled to the at least one processor. The at least one processor includes first circuitry configured to determine that first data is scheduled for transmission in an uplink high speed dedicated physical control channel (HS-DPCCH) in a transmission time interval (TTI), and second circuitry configured to determine that second data is scheduled for transmission in an uplink data channel in the TTI. The at least one processor further include third circuitry configured to if the apparatus would be transmit-power limited when transmitting the first data and second data concurrently, forgo building the second data for transmission during the TTI These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
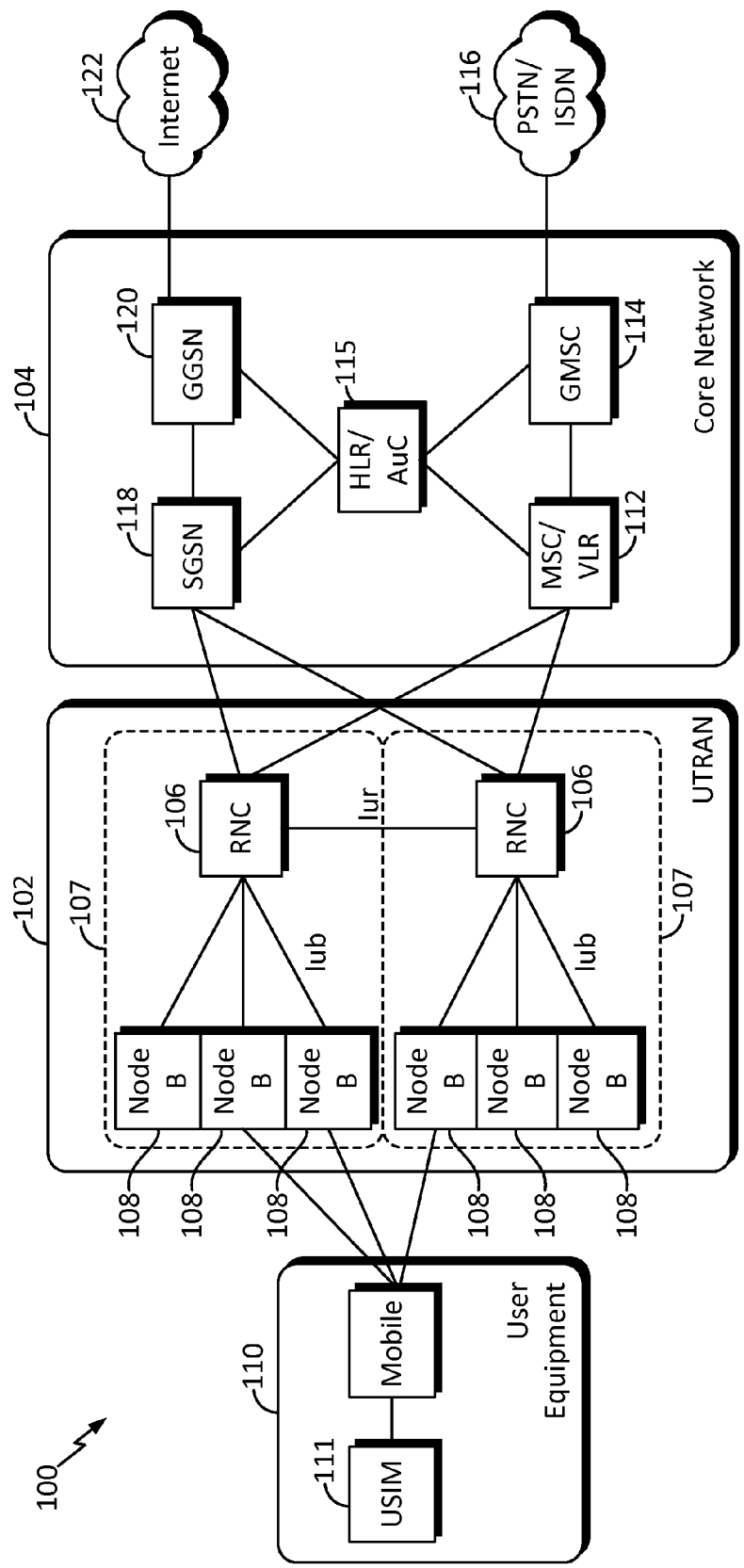
FIG. 1 is a block diagram conceptually illustrating an example of a telecommunications system.

Various aspects of the present disclosure provide methods and apparatuses that can avoid or reduce the application of power scaling in uplink transmission of a wireless communication device. The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The air interface between the UE 110 and the UTRAN 102 may be a high speed packet access (HSPA) air interface that includes a series of enhancements to the 3G/W-CDMA standard, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCHs. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission. The ACK/NACK transmission reflects the results of the CRC check of the received packets in the downlink.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

Figure 2:
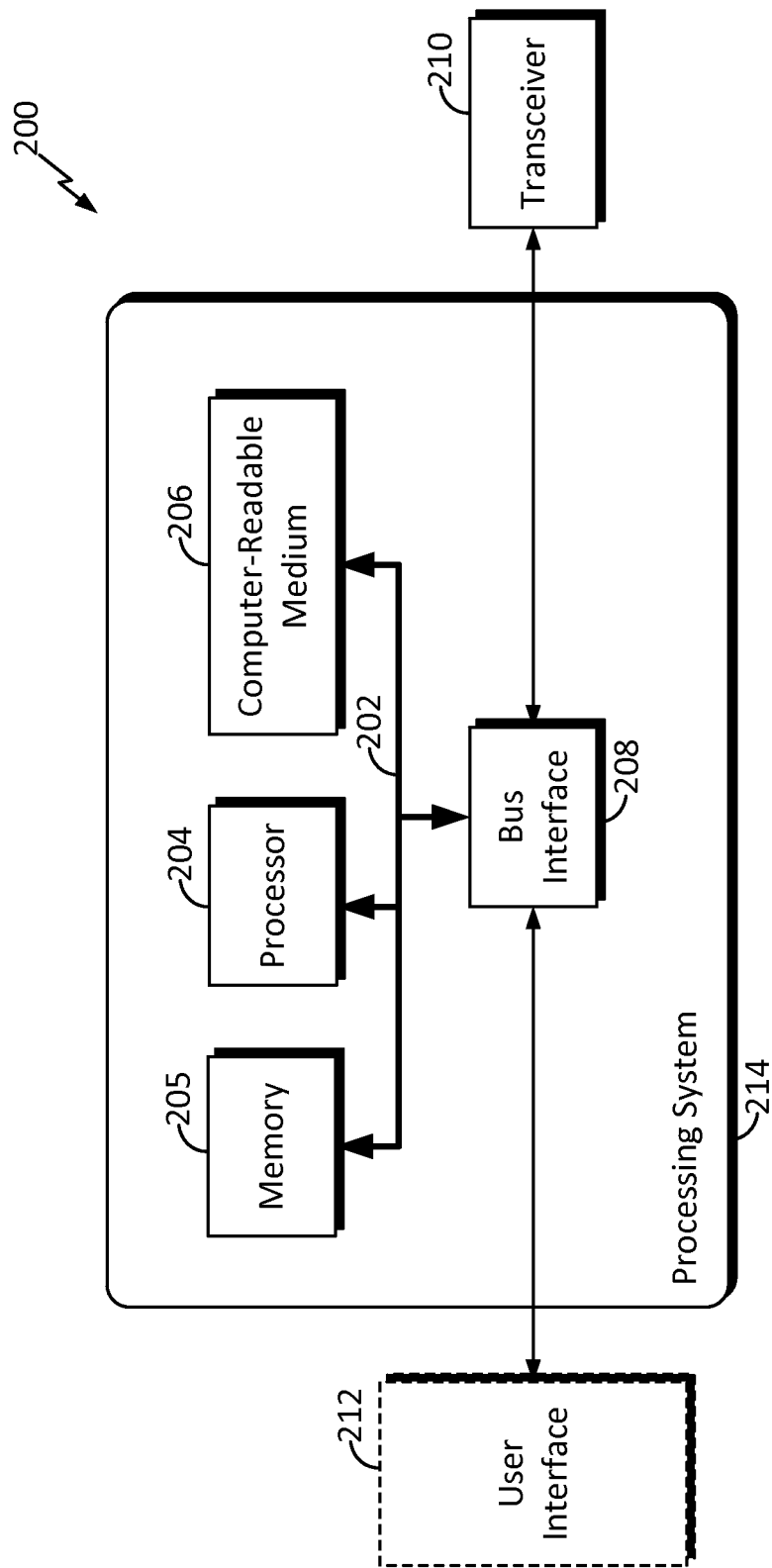
FIG. 2 is a block diagram illustrating an example of a hardware implementation for an apparatus employing a processing system in accordance with an aspect of the disclosure.

FIG. 2 is a conceptual diagram illustrating an example of a hardware implementation for an apparatus 200 employing a processing system 214. In accordance with various aspects of the disclosure, an element, or any portion of an element, or any combination of elements may be implemented with a processing system 214 that includes one or more processors 204. In an aspect of the disclosure, the UE 110 may be implemented with the apparatus 200. For example, the apparatus 200 may be a user equipment (UE) as illustrated in any one or more of FIGS. 1, and/or 5. In another example, the apparatus 200 may be a radio network controller (RNC) as illustrated in FIG. 1. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 204, as utilized in an apparatus 200, may be used to implement any one or more of the processes described below and illustrated in FIGS. 6-12.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210 (a communication interface). The transceiver 210 provides a means for communicating with various other apparatus over a transmission medium. Depending upon the nature of the apparatus, a user interface 212 (e.g., keypad, display, speaker, microphone, joystick, touchscreen, touchpad) may also be provided.

Figure 3:
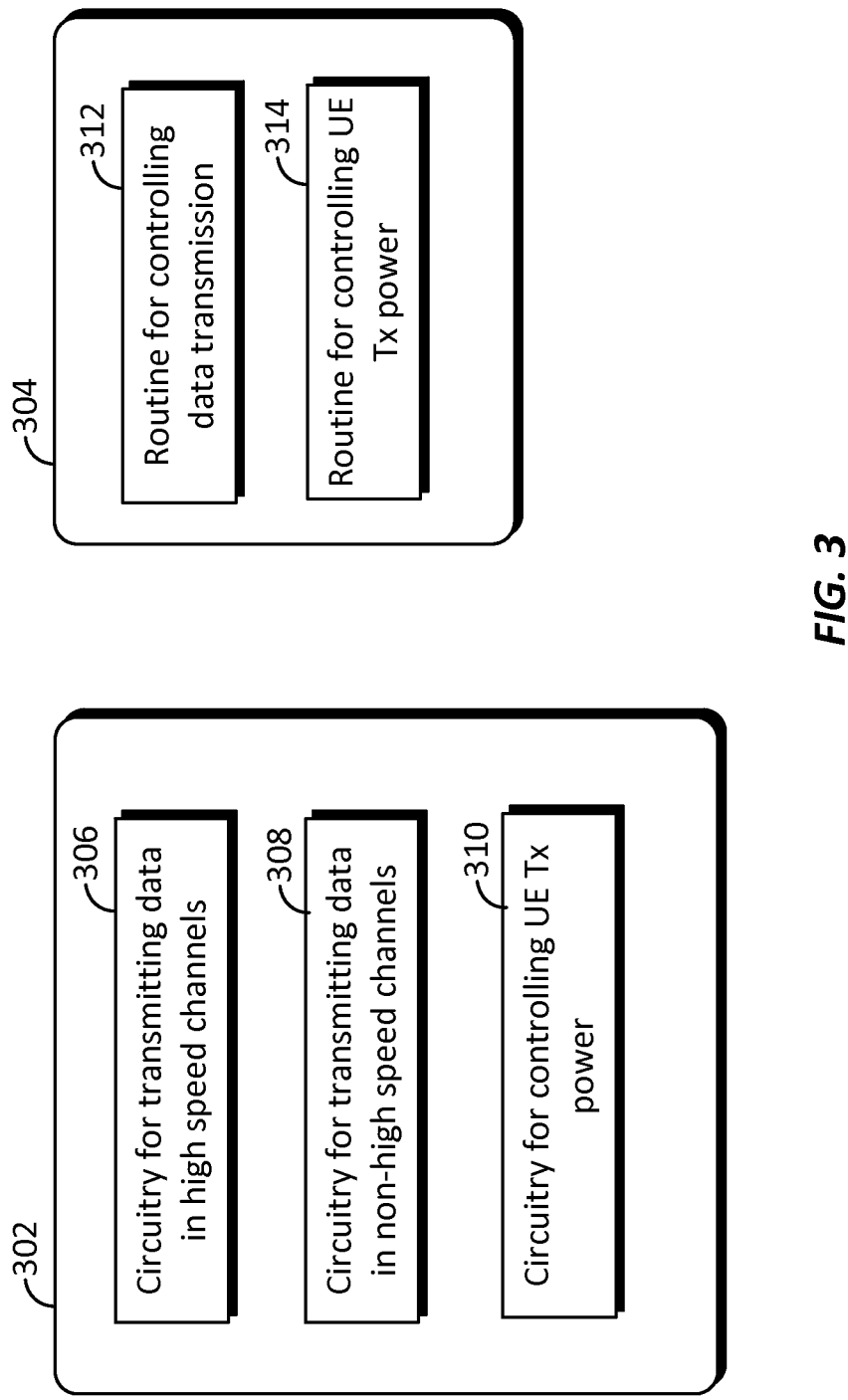
FIG. 3 is a block diagram illustrating the apparatus of FIG. 2 in more detail in accordance with an aspect of the disclosure.

FIG. 3 is a conceptual diagram illustrating a processor 302 and a computer-readable medium 304 in accordance with an aspect of the present disclosure. In an aspect of the disclosure, the processor 302 may be the processor 204 illustrated in FIG. 2, and the computer-readable medium 304 may be the computer readable medium 206 illustrated in FIG. 2. The processor 302 has various circuitries that may be configured to perform the functions described in relation to FIGS. 6-12 below. The computer-readable medium 304 stores various software routines that when executed may configure the circuitries of the processor 302 to perform the functions described throughout this specification.

The processor 302 includes first circuitry 306 for determining, scheduling, building, and transmitting data in high speed channels (e.g., HS-DPCCH) and second circuitry 308 for determining, scheduling, building, and transmitting data in non-high speed channels (e.g., DCH, and E-DCH). The processor 302 includes third circuitry 310 for determining whether or not the UE is transmit-power limited and controlling (e.g., scaling) the UE transmit power on various channels (e.g., HS-DPCCH, DCH, E-DCH, and DPCCH). In some aspects of the disclosure, the third circuitry 310 may boost a transmit power level of a NACK transmission or message on the HS-DPCCH. The circuitries illustrated in FIG. 3 and described throughout this specification may be hardware, software, or a combination of software and hardware.

The computer-readable medium 304 includes a first routine 312 that configures the circuitries of the processor 302 to perform functions related to scheduling, building and transmission of data on high speed channels and non-high speed channels. The computer-readable medium 304 includes a second routine 314 that configures the circuitries of the processor 302 to perform functions related to transmit power control of the UE as described in relation to FIGS. 6-12.

Referring back to FIG. 2, the processor 204 is responsible for managing the bus 202 and general processing, including the execution of software stored on the computer-readable medium 206. The software, when executed by the processor 204, causes the particular apparatus. For example, the software may include routines for controlling the uplink transmission of a UE 110 to reduce or avoid power scaling when the UE is transmit-power limited. The computer-readable medium 206 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 4:
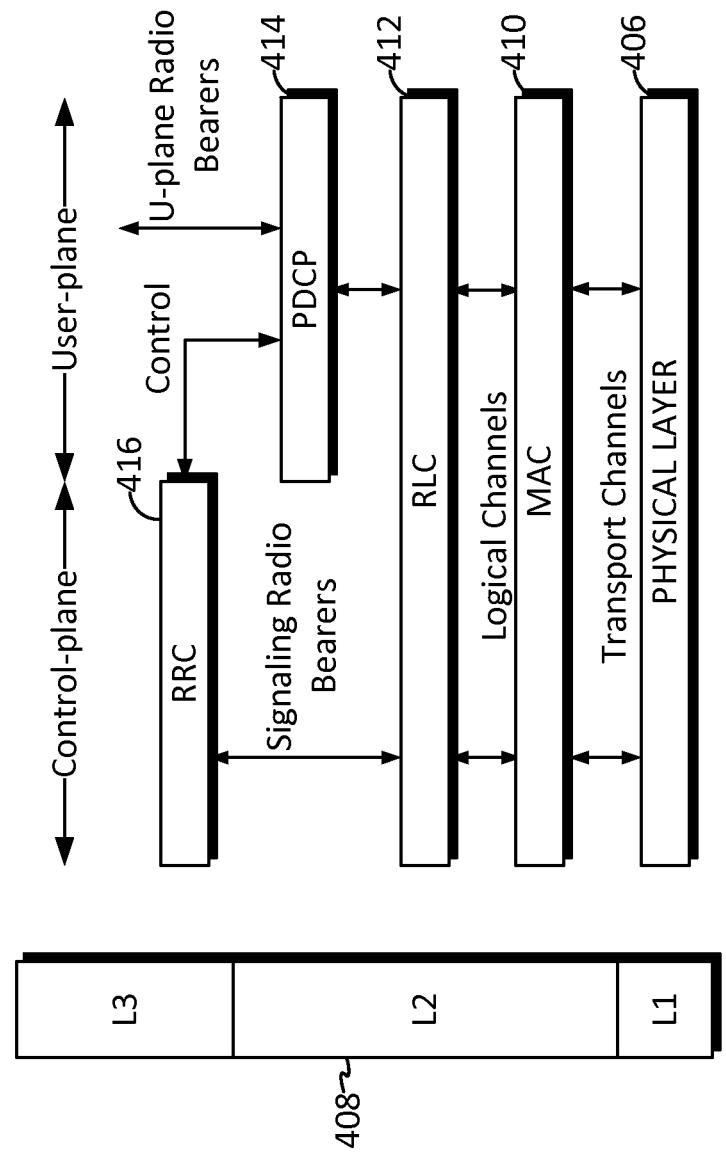
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 110 and Node B 108 over the physical layer 406.

At Layer 3, the RRC layer 416 handles the control plane signaling between the UE 110 and the Node B 108. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
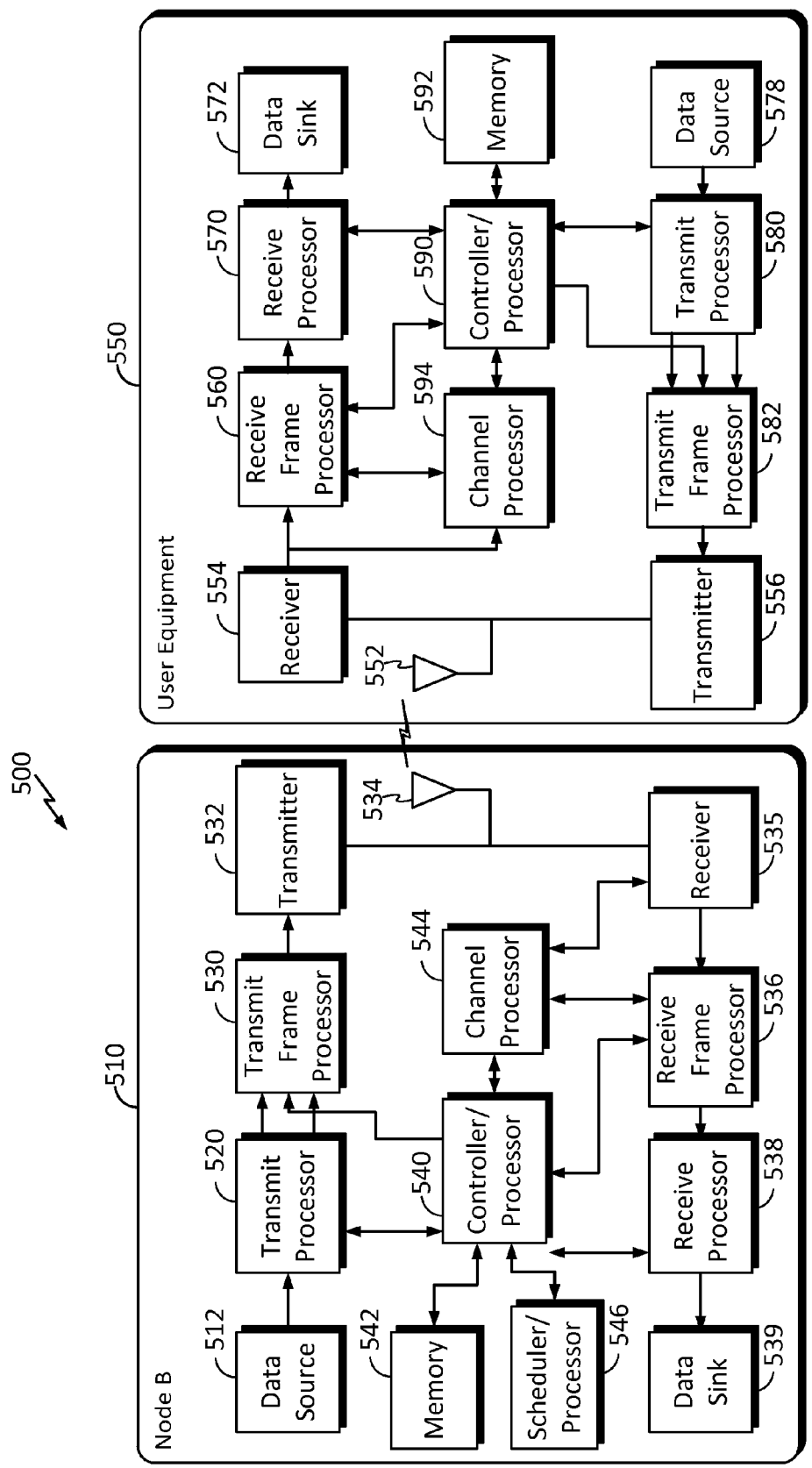
FIG. 5 is a block diagram conceptually illustrating an example of a Node B in communication with a user equipment in a telecommunications system.

FIG. 5 is a block diagram of an exemplary Node B 510 in communication with an exemplary UE 550, where the Node B 510 may be the Node B 108 in FIG. 1, and the UE 550 may be the UE 110 in FIG. 1. In an aspect of the disclosure, the UE 550 may be the UE 110 implemented with the apparatus 200. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

In a UMTS system (e.g., system 100), the transport channels are services that the physical layer provides to the higher layers. A dedicated channel (DCH) is one of the transport channels. Within one transmission time interval (hereafter "TTI"), the physical layer 406 exchanges transport blocks with the MAC layer 410 in one or more transport channels. The set of transport blocks within one TTI of a transport channel is called the transport block set. For a transport channel, a transport format (hereafter "TF") refers to the format used for data exchange between the physical layer 406 and the MAC layer 410 within one TTI. The set of transport formats corresponding to each transport channel is called a transport format set. The number of each TF in the transport format set is called the transport format indicator (hereinafter "TFI"). One combination of the TFs of one transport channel is called a transport format combination (hereafter "TFC"). The physical layer 406 combines the TFI information from different transport channels to generate the transport format combination indicator (TFCI). The TFCI is transmitted in the physical control channel to inform the receiver which transport channels are active for the current frame so that the receiver can receive the data on the dedicated physical data channel (DPDCH) correctly. With the received TFCI, the TFI of each transport channel can be obtained so that the receiving end can decode the information included in each transport channel. In existing UMTS systems, the TFCI and the DPDCH corresponding to it are transmitted simultaneously or concurrently.

In HSPA, a number of channels are introduced such as an enhanced DCH (E-DCH) that is a dedicated transport channel. Several DCHs and E-DCHs can exist in the uplink transport channel of the UE. Similar to the DCH, the E-DCH can be used to transmit a number of transport blocks in various TFs. An enhanced transport format combination indicator (E-TFCI), similar to the TFCI, indicates the enhanced uplink TFC (E-TFC) of the E-DCH. The UE determines the TFCs that are available for a DCH based on at least a maximum transmit power for the UE. A TFC is selected from the available TFCs for the DCH. Based on a remaining power after the TFC selection, the E-TFCs are selected that are available for an E-DCH.

A UE (e.g., UE 110) may have the capability of transmitting a minimum set of TFCs, a minimum set of E-TFCs in the uplink transmission, or both minimum sets. These minimum sets are described in detail in the 3GPP Technical Specification (TS) 25.331, which is incorporated herein by reference in its entirety. When the UE is configured to transmit a minimum set of TFCs, the UE is operating in a minimum set TFC mode. In addition, when the UE is configured to transmit a minimum set of E-TFCs, the UE is operating in a minimum set E-TFC mode. Further, the UE may be configured to transmit both minimum sets (TFCs and E-TFCs) in a multiple radio access bearers (Multi-RAB) mode. In these modes, when the total transmit (Tx) power of the UE exceeds the maximum allowed value, which may be determined by the network, the UE applies power scaling in order to support the minimum sets of TFC/E-TFC data in addition to the transmission on the HS-DPCCH.

For example, in accordance with the 3GPP Technical Specification 25.214 (TS 25.214), when the total UE transmit power (after applying DPCCH power adjustments and gain factors) would exceed the maximum allowed value (i.e., Tx power limited), the UE applies additional scaling to the total transmit power so that it does not exceed the maximum allowed power. For example, the power ratio between DPCCH and DPDCH, and also between DPCCH and HS-DPCCH, may be maintained (see, e.g., sub-clauses 5.1.2.5 and 5.1.2.5A in 3GPP TS 25.214). For any additional scaling of the total transmit power, the power ratio between DPCCH and DPDCH, between DPCCH and HS-DPCCH, and between DPCCH and E-DPCCH, may be maintained (see, e.g., sub-clauses 5.1.2.5, 5.1.2.5A and 5.1.2.5B.1 of 3GPP TS 25.214). For example, the relative power between DPCCH and DPDCH may be controlled by varying the gain factors $\beta_c$ and $\beta_d$ for each TFC. Also, the relative power between HS-DPCCH and DPCCH may be controlled by varying the gain factors $\beta_{hs}$ and $\beta_c$. These gain factors are defined in detail in 3GPP TS 25.214.

Due to the power scaling, there is a possibility that the data of the HS-DPCCH is not decoded reliably on the network side (receiving end). For example, if the HARQ ACK of the HS-DPCCH is decoded as a discontinuous transmission (DTX), the network might end up retransmitting the acknowledged data which will be decoded as duplicate data and discarded by the UE. This will result in sub-optimal usage of the radio resources and degraded effective data throughput at the UE, which is already operating in peak power range. In another example, if the HARQ NAK of the HS-DPCCH is decoded as an HARQ ACK, the network might end up transmitting new data, which will result in discarding the previous HARQ TTI data at the UE.

Especially in cases when signaling radio bearers (SRB) are carried over the HS-DPCCH, any degraded reliability of HS-DPCCH performance at the network receiving end due to power scaling can result in the loss of signaling messages that can cause call drops, increased signaling overhead (e.g., duplicate transmissions or repeated RLC level retransmissions), and degraded radio resource utilization.

Figure 6:
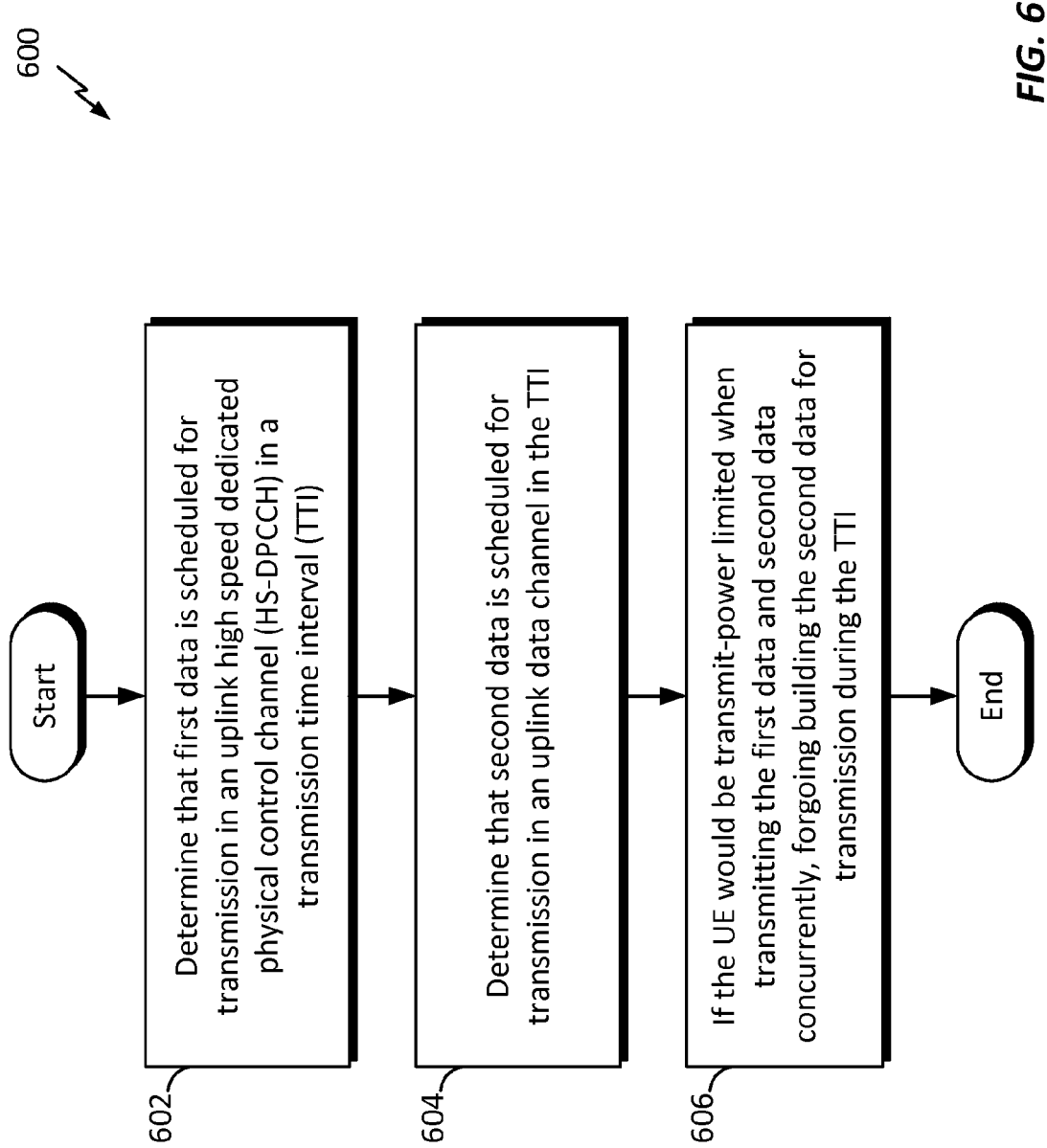
FIG. 6 is a flowchart illustrating a method of controlling uplink data transmission at a user equipment to avoid power scaling in accordance with an aspect of the disclosure.
Figure 7:
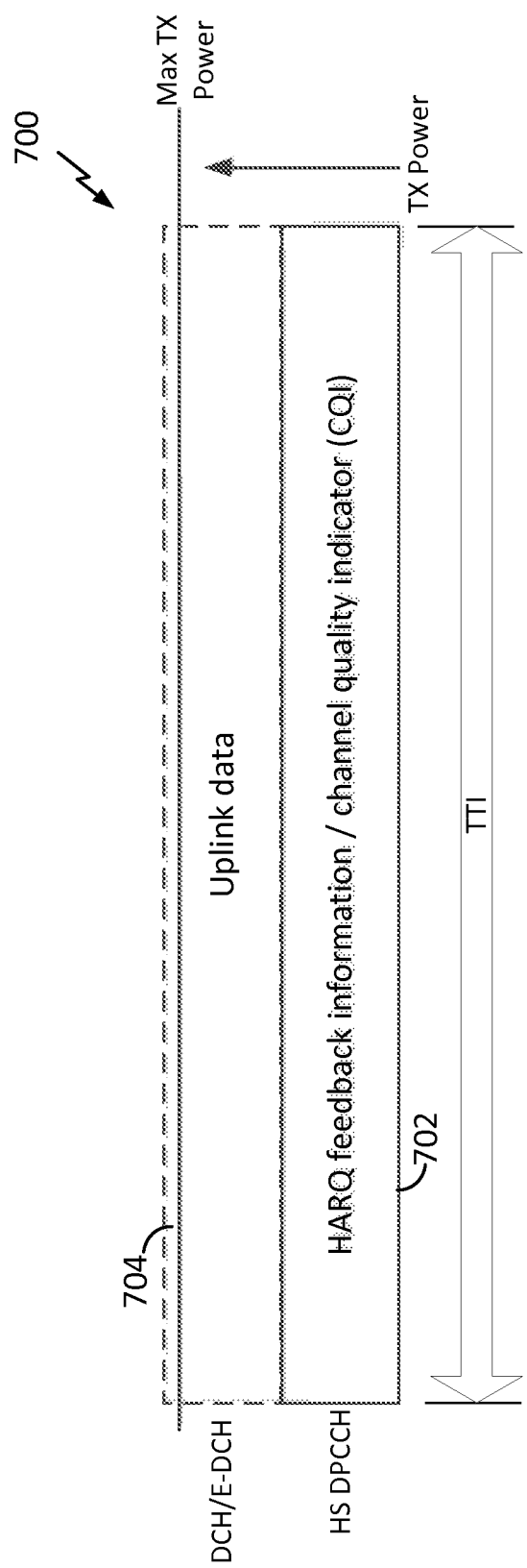
FIG. 7 is a conceptual diagram illustrating uplink data transmission on an uplink data channel and a high speed uplink control channel in accordance with an aspect of the disclosure.

In accordance with aspects of the present disclosure, a UE is configured to avoid or forgo building uplink data in an upcoming frame (TTI) to avoid any power scaling when HARQ feedback information (e.g., ACK/NAK transmission) will be present in the frame. FIG. 6 is a flowchart illustrating a method 600 of wireless communication operable at a UE in accordance with an aspect of the disclosure. In one aspect of the disclosure, the method 600 may be operable at the UE 110 illustrated in FIG. 1 or the UE 550 illustrated in FIG. 5. In another aspect of the disclosure, the method 600 may be performed by any suitable apparatus such as the apparatus 100. In block 602, the UE determines that first data is scheduled for transmission in an uplink high speed dedicated physical control channel (HS-DPCCH) in a transmission time interval (TTI). Referring to FIG. 7, the first data may be HARQ feedback information or CQI 702. In an example, the HARQ feedback information may be the HARQ ACK or NACK for transmission in an HS-DPCCH.

In block 604, the UE determines that second data is scheduled for transmission in an uplink data channel in the same TTI. In an aspect of the disclosure, the uplink data channel may be DCH or E-DCH 704 in FIG. 7. In block 606, if the UE would be transmit-power limited (i.e., Tx power being greater than maximum Tx power of UE) when transmitting the first data and second data concurrently (see FIG. 7), the UE may forgo (or avoid) building the second data for transmission during the TTI. According to the method 600, the total transmit power of the UE may be reduced by not transmitting the uplink data concurrently with the HARQ feedback information or CQI. Therefore, the UE may avoid applying power scaling to the transmission on the HS-DPCCH.

Figure 8:
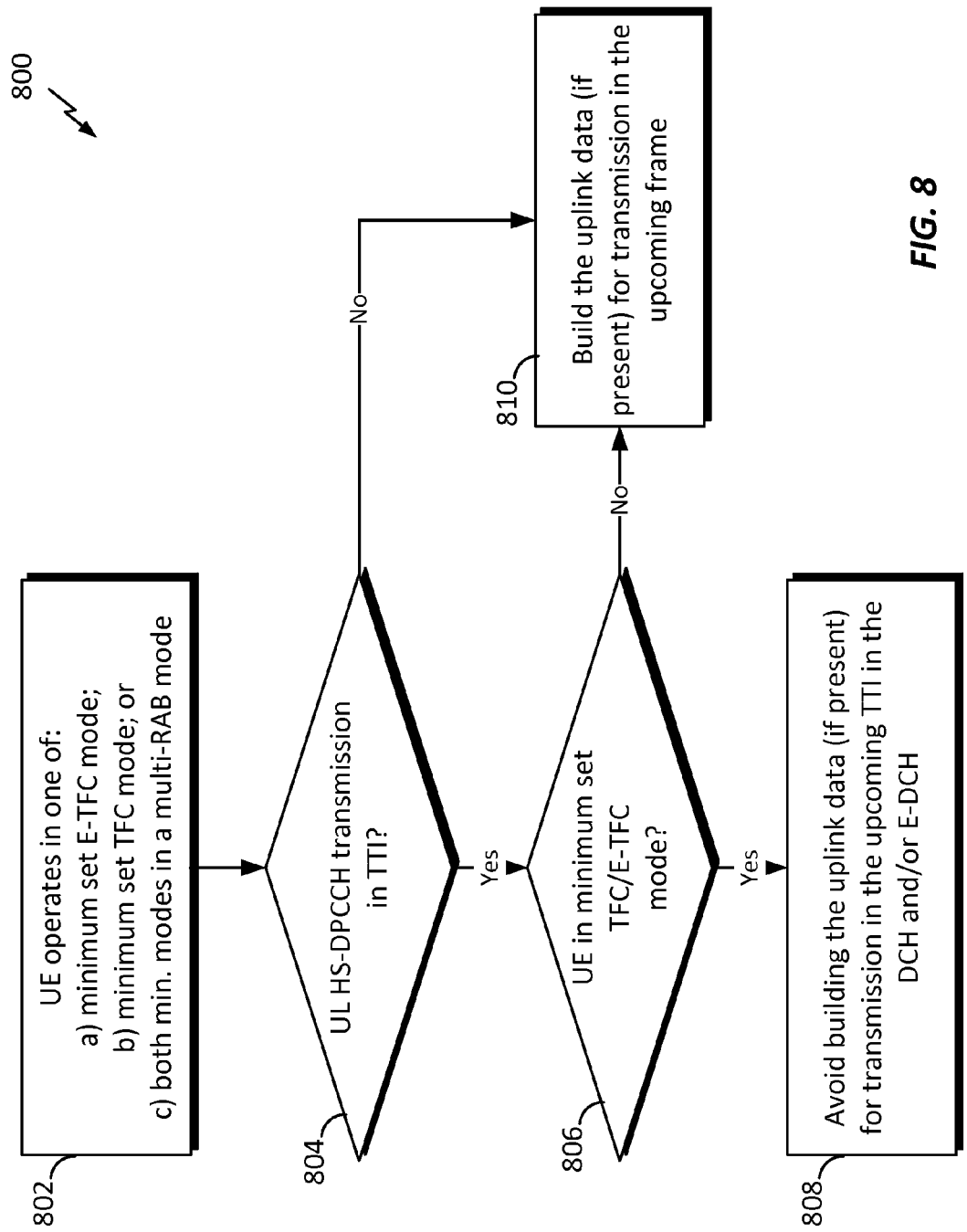
FIG. 8 is a flowchart illustrating a method of wireless communication operable at a user equipment in a minimum set mode to avoid power scaling in accordance with an aspect of the disclosure.

FIG. 8 is a flowchart illustrating a method 800 of controlling uplink data transmission at a UE to avoid power scaling in accordance with aspects of the disclosure. In one aspect of the disclosure, the method 800 may be operable at the UE 110 illustrated in FIG. 1 or the UE 550 illustrated in FIG. 5. In another aspect of the disclosure, the method 800 may be performed by any suitable apparatus such as the apparatus 200. Referring to FIG. 8, in block 802, the UE may be operating in one of the following modes: a) a minimum set E-TFC mode (with E-DCH in the uplink), b) a minimum set TFC mode (with DCH in the uplink), or c) both minimum set E-TFC/TFC modes in a Multi-RAB mode. In block 804, it is determined whether or not there is uplink transmission on the HS-DPCCH in a certain TTI (e.g., an upcoming TTI). For example, the transmission may be HARQ feedback information or CQI 702 illustrated in FIG. 7. The HARQ feedback information may be HARQ ACK/NAK transmission for the data received in the earlier TTIs. For example, the firmware of the UE may be configured to indicate the presence of HARQ ACK/NAK information scheduled for transmission in the HS-DPCCH.

In block 806, it is determined whether or not the UE is operating in the minimum set TFC mode and/or minimum set E-TFC mode. If the UE is operating in the minimum set TFC mode and/or minimum set E-TFC mode and data is scheduled for transmission in the HS-DPCCH, the UE may avoid or forgo building uplink data (if present) for transmission in the same upcoming TTI in the DCH and/or E-DCH in block 808. Accordingly, power scaling may be avoided because no power is needed to transmit the uplink data. If the UE is not operating in the minimum set TFC/E-TFC mode or no uplink data is scheduled for transmission in the HS-DPCCH, the UE may build the uplink data (if present) for transmission on the DCH and/or E-DCH in the upcoming frame in block 810.

In accordance with the method 800, when the signaling radio bearers (SRB) are transmitted over HSPA channels (e.g., HS-DPCCH), any improved performance on the HSPA channels could result in direct improvement of the call performance and signaling load reduction. In various aspects of the disclosure, the method 800 may be applied to downlink SRB traffic alone or may be extended to data radio bearers also. In some aspects of the disclosure, the method 800 may be extended to an HS-DPCCH carrying only the channel quality indicator (CQI) (e.g., CQI 702 of FIG. 7). For example, the UE may avoid or forgo sending uplink data on DCH and/or E-DCH when the CQI is transmitted on the HS-DPCCH. The method 800 may be implemented at a UE without any specification changes on the network side.

In accordance with other aspects of the disclosure, a UE may prioritize the HS-DPCCH transmission over the non-HS DPCCH (e.g., 3GPP Release 99 DPCCH, hereafter referred to as the "DPCCH") transmission. In one aspect of the disclosure, this technique can be performed by reducing the transmission power of the DPCCH non-pilot bits when the UE is transmit-power limited. For example, the non-pilot bits of the UL DPCCH include the transmission power control (TPC) bits, TFCI bits, and feedback information (FBI) bits.

Figure 9:
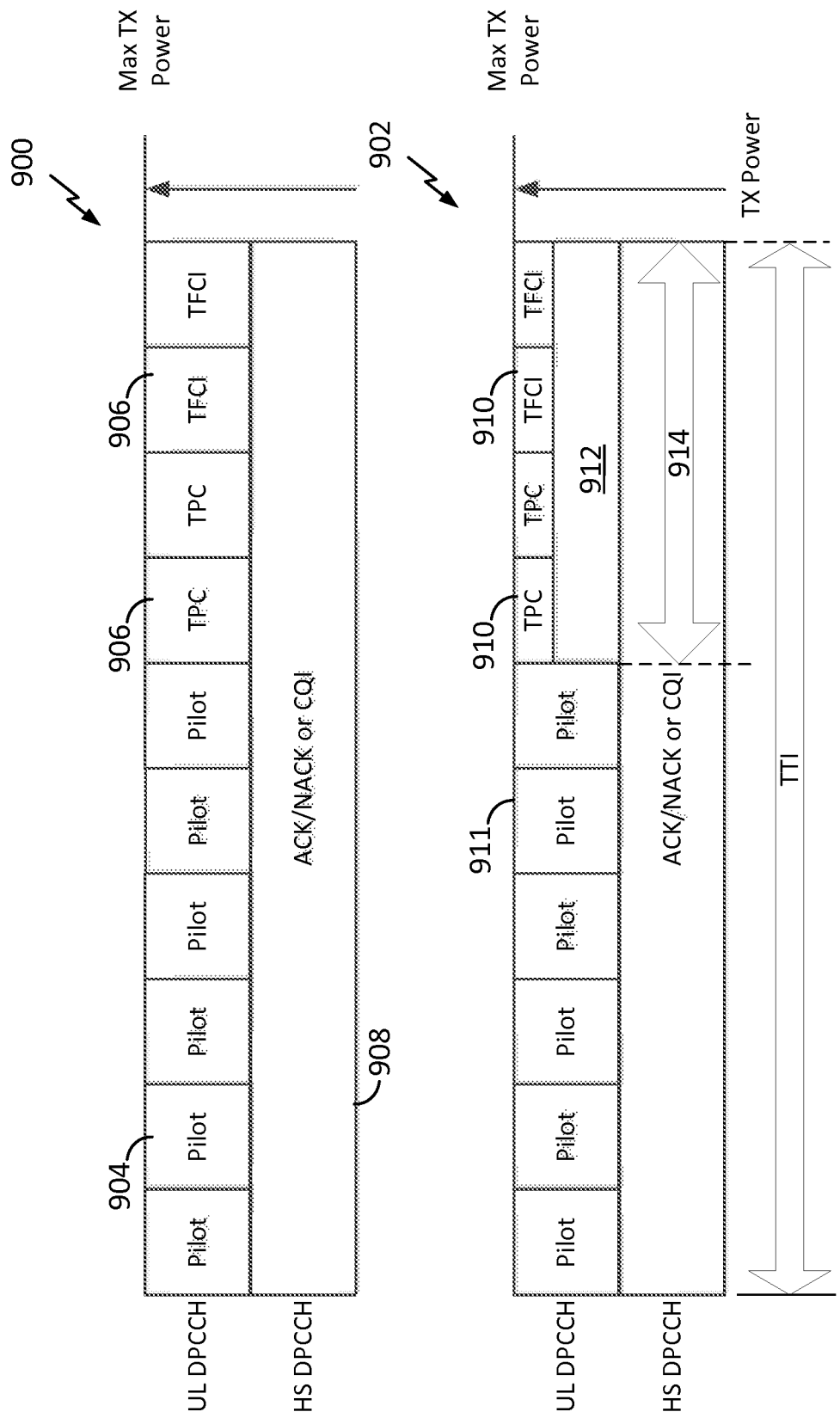
FIG. 9 is a conceptual diagram illustrating the transmit power of an uplink DPCCH and HS-DPCCH in accordance with a comparative example and an aspect of the disclosure, respectively.

FIG. 9 is a conceptual diagram illustrating the combined transmit powers of UL DPCCH and HS-DPCCH in accordance with an example and an aspect of the disclosure, respectively. In a power allocation scheme 900, the pilot bits 904 and the non-pilot bits 906 of a UL DPCCH are transmitted at the same power level when, concurrently in the same TTI, the HS-DPCCH is transmitting the HARQ feedback information 908 (e.g., ACK or NAK) or CQI. However, in a power allocation scheme 902 according to an aspect of the disclosure, a portion of the UL DPCCH data is transmitted at a reduced power level. For example, the transmit power of the non-pilot bits 910 (e.g., TPC and TFCI) are less than that of the pilot bits 911 in the same TTI. Therefore, more transmit power 912 may be allotted for the HS-DPCCH transmission during the time interval 914 of the TTI. Therefore, power scaling may be avoided. In both schemes, the combined transmit power of the UL DPCCH and HS-DPCCH cannot exceed the maximum transmit (Tx) power of the UE.

Figure 10:
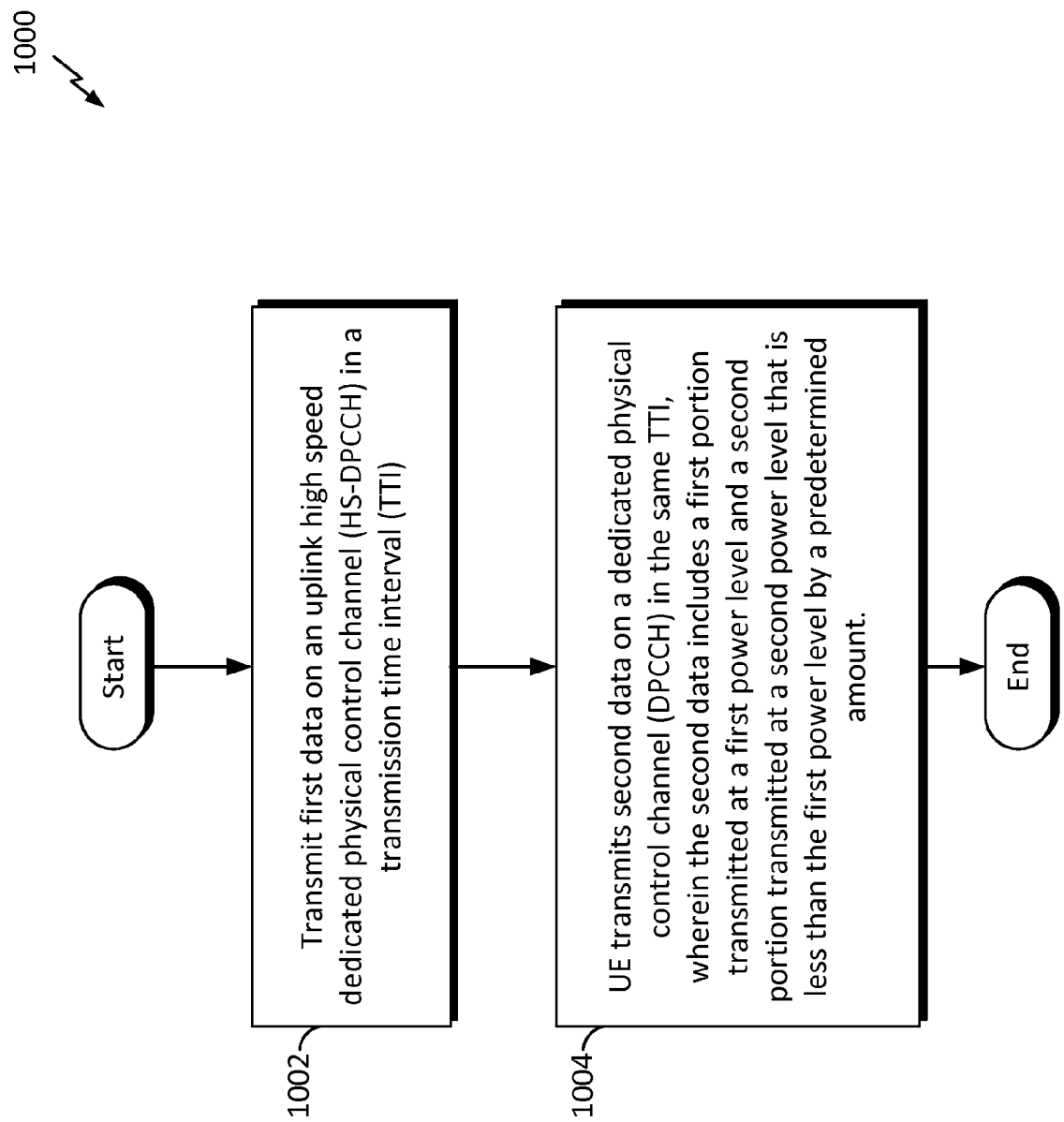
FIG. 10 is a flowchart illustrating a method of wireless communication operable at a user equipment when transmit-power limited to avoid power scaling the HS-DPCCH in accordance with another aspect of the disclosure.

FIG. 10 is a flowchart illustrating a method 1000 of wireless communication operable at a UE in accordance with an aspect of the disclosure. In one aspect of the disclosure, the method 1000 may be operable at the UE 110 illustrated in FIG. 1 or the UE 550 illustrated in FIG. 5. In another aspect of the disclosure, the method 1000 may be performed by any suitable apparatus such as the apparatus 200. For example, a UE is scheduled to transmit first data on an HS-DPCCH and, concurrently, transmit second data on a UL DPCCH (e.g., Release 99 DPCCH). In block 1002, the UE transmits first data on an HS-DPCCH in a certain TTI. In block 1004, the UE transmits second data on a dedicated physical control channel (DPCCH) in the same TTI. The second data includes a first portion transmitted at a first power level and a second portion transmitted at a second power level that is less than the first power level by a predetermined amount. In this case, the UE may be transmit-power limited. Therefore, the UE may reduce the transmission power of non-pilot bits (e.g., non-pilot bits 910 of FIG. 9) on the UL DPCCH to avoid power scaling. In an example, the non-pilot bits may be TCP bits, TFCI bits, and FBI bits.

According to various aspects of the disclosure, a receiving device involved in a call is configured to selectively boost a transmit power of a NACK message sent in response to a received message. As such, the receiving device may experience improved call retention and/or reduced call drops, thereby improving operations of the communication network and improving a user experience of the users of both the receiving device and the transmitting device.

Figure 11:
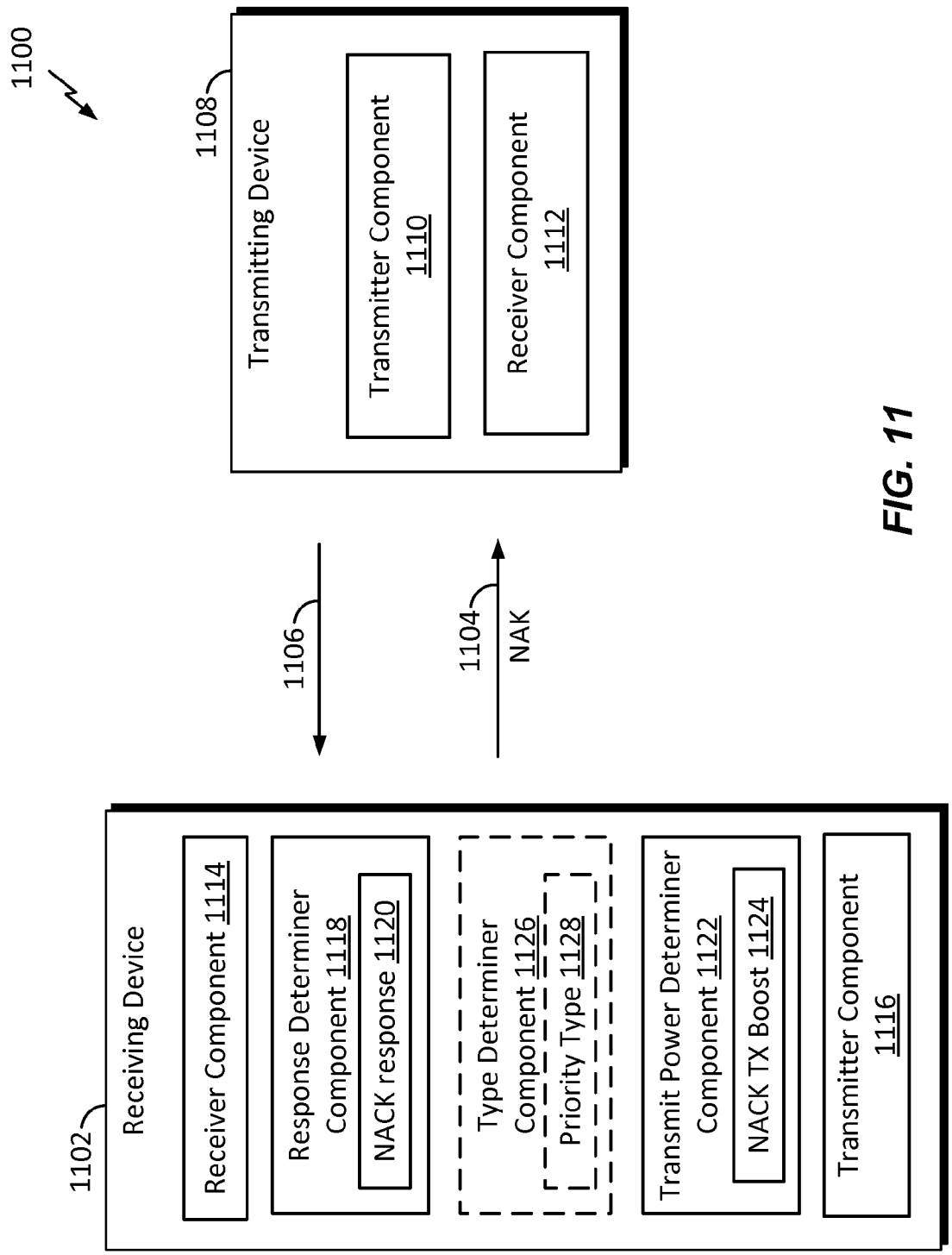
FIG. 11 is a conceptual diagram illustrating a wireless communication system including a receiving device configured to selectively boost a transmit power of a negative acknowledgement (NACK) message sent in response to a message received in a call from a transmitting device in accordance with an aspect of the disclosure.

FIG. 11 is a conceptual diagram illustrating a wireless communication system 1100 including a receiving device 1102 configured to selectively boost a transmit power of a NACK message 1104 sent in response to a message 1106 received in a call from a transmitting device 108 in accordance with an aspect of the disclosure. In one aspect of the disclosure, the receiving device 1102 may be the UE illustrated in FIG. 1 or 5, and the transmitting device 1108 may be the Node B illustrated in FIG. 1 or 5. In other aspects of the disclosure, the transmitting device 1108 may be a UE, and the receiving device 1102 may be a base station. It should be noted, however, that the receiving device 1102 and transmitting device 1108 may be any two devices involved in wireless The transmitting device 1108 includes a transmitter component 1110 configured to transmit a message 106 to the receiving device 1102, and a receiver component 1112 configured to receive a NACK message 1104 from the receiving device 1102. Similarly, receiving device 102 includes a receiving component 114 configured to receive the message 1106 from the transmitting device 1108, and a transmitter component 1116 configured to transmit a NACK message 1104 to the transmitting device 1108. In an aspect of the disclosure, the transmitter component 1110 and receiver component 1112 of the transmitting device 1108, and receiver component 1114 and transmitter component 1116 of the receiving device 1102, may include a transceiver and transmit chain and receive chain components configured to respectively transmit or receive signals.

The message 1106 includes a feedback response message, which is a type of message that requires the receiving device to provide a response, for example, a NACK message 1104 to indicate that the message 1106 was not properly received. The message 1104 may optionally include an acknowledged (ACK) message to indicate that the message 1106 was properly received. In an aspect of the disclosure, the receipt of the NACK message 1104 at the transmitting device 1108 triggers the transmitting device to re-transmit a message 1106. Further, the receipt of an ACK message allows the transmitting device 1108 to confirm receipt of the message 1106 by the receiving device 1102, and also, for example, may trigger the transmitting device 1108 to clear any stored copies of the message 1106, such as from a re-transmission queue or buffer.

According to some aspects of the disclosure, the receiving device 1102 includes a response determiner component 1118 configured to determine, based on processing of the message 1106, whether to send a response and what type of response to send. For example, the response determiner component 1118 may perform an error check, such as but not limited to a cyclic redundancy check (CRC), on the message 1106 or otherwise determine that the message 1106 cannot be decoded or understood properly. Upon detecting such an error, the response determiner component 1118 determines a NACK response 1120, which thereby causes generation and transmission of a NACK message 1104. In contrast, according to other aspects of the disclosure, when the response determiner component 1118 detects no errors or that the message 1106 is otherwise received and decoded properly, then the response determiner component 1118 may determine that either no response is necessary, or that an ACK response should be sent, thereby leading to generation and transmission of an ACK message.

Additionally, the receiving device 1102 includes a transmit power determiner component 1122 configured to selectively adjust a transmit power level of signals sent by the transmitter component 1116. In particular, according to some aspects of the disclosure, when detecting the determination of NACK response 1120 or whenever transmitting a NACK message, the transmit power determiner 1122 applies a NACK transmit power boost 1224 to increase a transmit power level of a NACK message 1104. For example, the transmit power determiner component 1122 and/or NACK transmit power boost 1124 may cause an increase in the transmit power of a NACK message 1104 from a first power level to a second power level, wherein the first power level corresponds to a network-specified power level for a NACK message, and wherein the second power level is greater than the first power level.

In contrast, when detecting the determination of an ACK response or whenever transmitting an ACK message, the transmit power determiner component 1122 may apply a network-specified transmit power level (which may be different for an ACK message as compared to that of a NACK message) without applying any boost or increase in power. It is noted that increasing the transmit power of an ACK message may not be necessary because the message 1106 is already properly received, and any lack of receipt of an ACK message by the transmitting device 1108 may cause an unnecessary re-transmission of a message 1106. On the other hand, a lack of proper receipt of a NACK message 1104 by the transmitting device 1108 may lead to a call drop. As such, by increasing the transmit power of a NACK message 104 to a level above a network-specified transmit power level, the transmit power determiner component 1122 helps to ensure that the NACK message 1104 is received by the transmitting device 1108, and thereby may aid in call retention and/or avoid a call drop.

Moreover, the transmit power determiner component 1122 may cause the receiving device 1102 to maintain the second power level, e.g., corresponding to the NACK transmit power boost 1124, for a given time period. For instance, but not limited hereto, this may apply to the use case where a Layer 2 (L2) ACK message from the transmitting device 1108, for instance corresponding to an uplink signaling radio bearer message, such as a reconfiguration complete message, from the receiving device 1102, is missing in the downlink. As such, this allows the receiving device 1102 to attempt to cause the transmitting device 1108, based on a plurality of messages sent over the given time period, to re-transmit a message corresponding to the NACK message.

In another aspect of the disclosure, the receiving device 1102 may optionally include a type determiner component 1126 configured to determine that the message 1106 is of a priority type 1128 of a transmission block. As used herein, a priority type of a transmission block may include, but is not limited to, one or more of: a transmission block having a transmission block size less than a transmission block size threshold, which may indicate, for example, a certain type of information such as signaling information (which is typically smaller in size than a transmission block including data); or a transmission block that includes a signaling radio bearer (SRB) transmission block, or an SRB transmission block received via a high speed (HS) channel; or, when the transmission block includes time sensitive information, such as voice call information; or, when the transmission block corresponds to predetermined application-specific information; or when the transmission block is determined to correspond to a given queue identifier (QID); or, when the receiving device 1102 is determined to be at an edge of a communication range relative to the transmitting device 1108, e.g., when a UE is at a cell edge of a base station. As such, in one aspect of the disclosure, the transmit power determiner component 1122 may be further configured to increase the transmit power from the first power level to the second power level based on determining that the message 106 has a certain priority type 1128 of the transmission block.

Thus, according to various aspects of the disclosure, the receiving device 1102 is configured to selectively boost a transmit power of a NACK message sent in response to a received message, which may improve call retention and/or reduce call drops or otherwise improve operation of the communication network and improve a user experience of the users of both the receiving device 1102 and transmitting device 1108.

Figure 12:
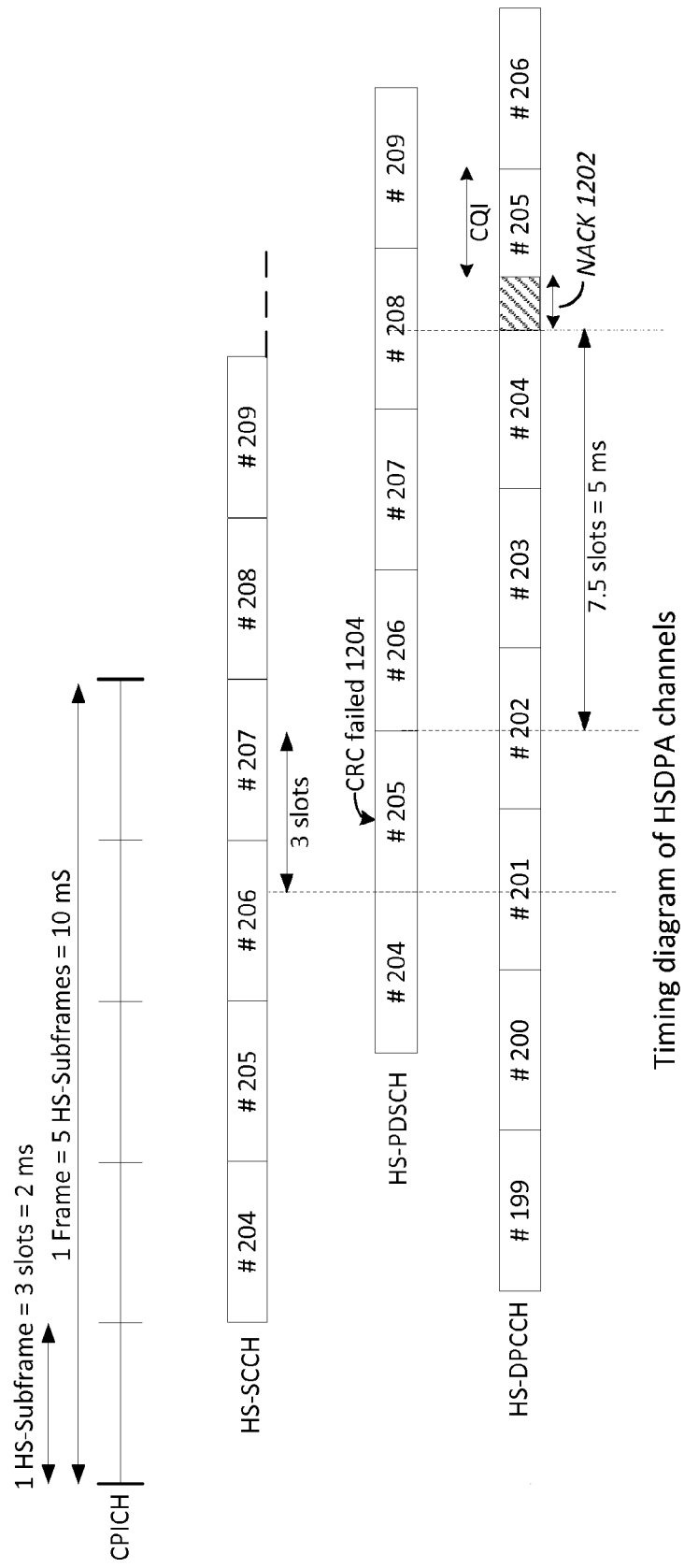
FIG. 12 is a timing diagram of high speed downlink packet access (HSDPA) channels illustrating NACK power boost in accordance with an aspect of the disclosure.

Referring to FIG. 12, in an example of a particular use case that should not be construed as limiting, a NACK message 1202 is sent in an HS-PDCCH channel of an uplink, where the NACK message 1202 corresponds to a downlink signaling transmission block with signaling radio bearers (SRB), e.g., subframe #205 on a HS-SCCH channel, on a high speed (HS) call between a receiving device 1102 and a transmitting device 1108 of FIG. 11. In this case, the receiving device 1102 and transmitting device 1108 may be a UE and a Node B, respectively, that have established the HS call, and the NACK message 1202 is based on a CRC error 1204 on a HS-PDSCH channel at a subframe #205. Accordingly, the NACK message 1202 on the HS-PDCCH channel, between subframes 204 and 206, is transmitted with boosted power. That is, the NACK message 1202 may be transmitted at a transmit power level above a network-specified power level for a NACK message.

For example, in a HS call, the network-specified power level may be set by an RNC, which may specify power offsets for different metrics of HS-DPCCH (e.g., ACK, NACK, and CQI) in a RadioBearerSetup or RadioBearerReconfiguration type of message. Such power offsets (with respect to UL-DPCCH) may be identified as delta_ACK, delta_NACK and delta_CQIs, which the UE converts into actual HS gains (also known as Beta_hs) for respective components. The details of this conversion are given in 3GPP Technical Specifications 25.213 and 25.214. In some aspects of the disclosure, the NACK transmit power boost 1202 and/or the increasing of the NACK transmit power from a first transmit power level to a second power level include adding an extra power value in addition to the power offsets. For example, the NACK transmit power boost 1202 or the extra power value may include, but is not limited to, values ranging from 0.5 decibel (dB) to up to several dB on top of the network-specified NACK power level. Thus, the boosting of the transmit power of the NACK message 1202 on the HS-PDCCH channel may mitigate a calls drop by reducing a probability of the NACK message being interpreted as an ACK message, or as an Erasure, by the transmitting device 1108.

Figure 13:
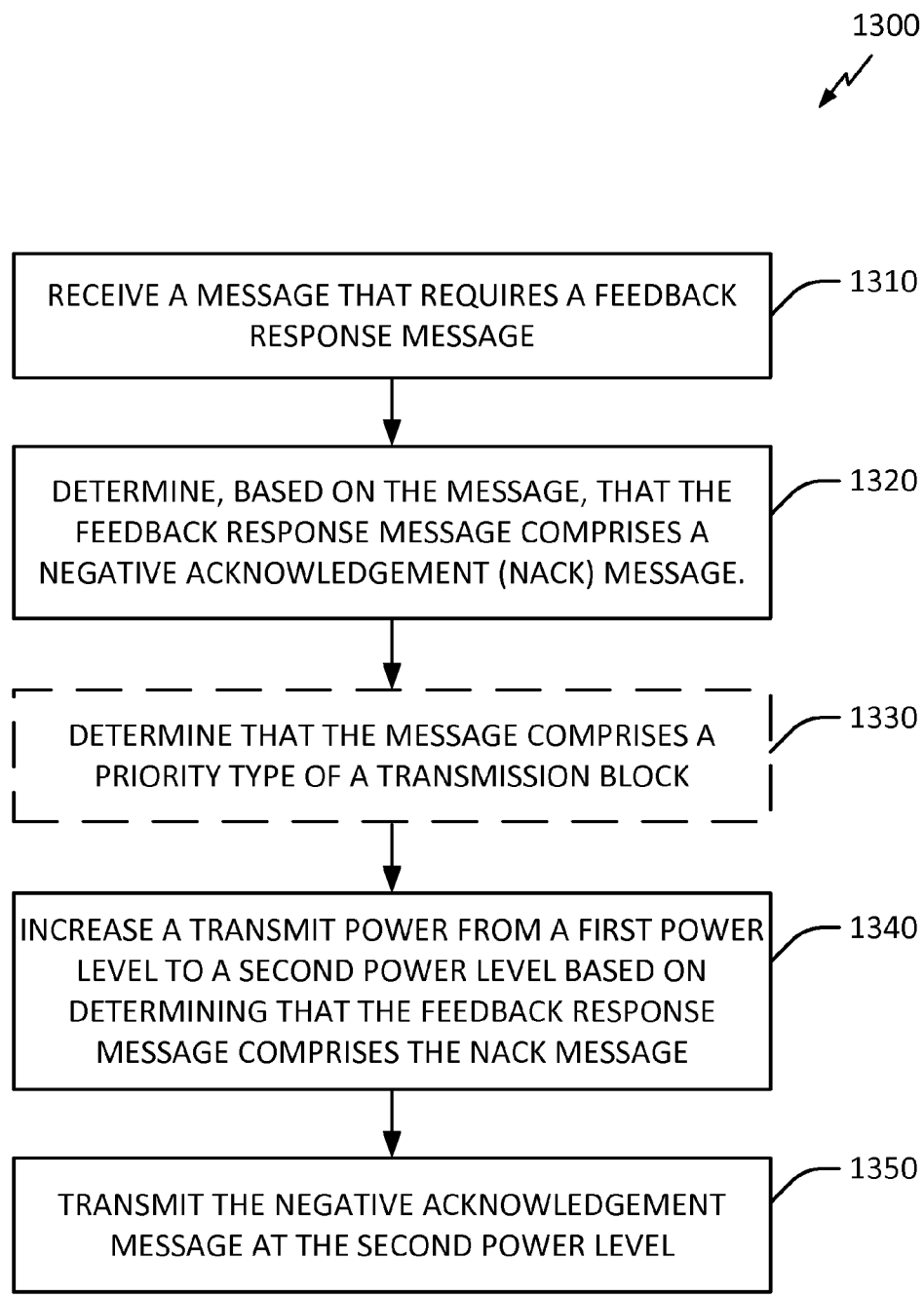
FIG. 13 a flowchart illustrating a method of selectively boosting the transmit power of a NACK message in accordance with an aspect of the disclosure.

FIG. 13 a flowchart illustrating a method 1300 of selectively boosting the transmit power of a NACK message in accordance with an aspect of the disclosure. The method 1300 may be performed by a receiving device 1102 of FIG. 11 or a UE illustrated in FIGS. 1 and 5. At block 1310, a message from a transmitting device is received at a receiving device, wherein the message requires a feedback response message including at least a negative acknowledgement (NACK) message. The NACK message indicates that the message was not properly received. In one aspect of the disclosure, the receiving device 1102 may include a receiver component 1114 configured to a receive message 1106 from a transmitting device 1108, and the message 1106 is a type of message for which a feedback response is to be sent.

At block 1320, it is determined, at the receiving device and based on the message, that the feedback response message includes the NACK message. In one aspect of the disclosure, the receiving device 1102 may include a response determiner component 1118 configured to determine, at least, that the message 1106 was not properly received, thereby generating a NACK response 1104.

Optionally, at block 1330, it is determined that the message is of a priority type of a transmission block. In one aspect of the disclosure, a type determiner component 1126 is configured to determine that the message 1106 includes a transmission block of priority type 1128.

For instance, in some cases, certain NACK messages may be given higher priority than others. For example, most of the signaling bearers are time sensitive. They involve certain L3 procedures that the UE and base station must complete within a stipulated time, e.g., an Activation Time. This may be even more relevant for SRB on HS types of calls, where the UE does not have any opportunity of diversity gains from other cells for signaling traffic. For example, in a Serving Cell Change procedure, the RNC will switch to the new cell just after the activation time and start dispatching all future signaling information from the new cell, so if the UE fails to complete the Serving Cell Change procedure in a timely manner, then the UE may still be lagging behind with the older serving cell. This can create complete disconnection of signaling between the UE and RNC, which will eventually and certainly lead to a call drop (besides the repercussions from RLC layer for potential RLC Resets).

Further, for example, transmission blocks of priority type 1128 may be based on one or more of a transmission block size, or whether the transmission block is SRB, or whether the transmission block is determined to correspond to a given QID or to a specific application.

Additionally, transmission blocks may be determined to be of priority type 1128 when they correspond to a NACK message when the receiving device 1102 is in an edge of coverage scenario, or when a UE is at a cell edge of a base station.

At block 1340, a transmit power is increased from a first power level to a second power level based on determining that the feedback response message includes the NACK message. The first power level corresponds to a network-specified power level of the NACK message, and the second power level is greater than the first power level. In an aspect of the disclosure, a transmit power determiner component 1122 determines a NACK transmit power boost 1124 based on an indicated NACK response 1120 or any NACK message, or optionally based on a NACK message corresponding to a transmission block of priority type 1128, as discussed above. Moreover, the increasing of the NACK transmit power may be maintained for a given time period, for example, to enable the receiving device 1102 to transmit a plurality of NACK messages with increased power.

At block 1350, the NACK message is transmitted at the second power level. In one aspect of the disclosure, a receiving device 1102 includes a transmit component 1116 configured to transmit a NACK message 1104, as discussed herein.

As such, in a non-limiting use case, the method 1300 provides a scheme to mitigate the probability of NACKs of SRB being lost in UL transmission. In one aspect of the disclosure, a UE can selectively boost the power of HS-DPCCH, only for the subframes where NACK is transmitted, and optionally for transmission blocks (TrBlks) that are less than a certain threshold. In other words, the transmit power of NACK may be boosted, e.g., increased Delta_NACK (e.g., BetaHS for NACK), by a certain amount of dB. For instance, in one aspect of the disclosure, the corresponding TrBlk has to be less than a certain threshold to qualify, where shorter thresholds are indicative of SRB. The relevance of a shorter TrBlk is that, usually, the TrBlks that carry SRB traffic are much smaller than TrBlks carrying packet switched (PS) traffic. However, there can still be some small TrBlks for PS traffic based on the application, and this scheme may benefit them as well, unless further conditions are imposed.

For example, in some aspects, the present apparatus and methods can be configured to exactly identify which QID and what TrBlk is SRB, so that this mechanism can be applied only for that particular size. As such, in this case, there is no need to apply the NACK transmit power boost for generic TrBlks with length less than the threshold.

In another aspect of the disclosure, a UE can also boost NACK transmission for cell edge areas in general to improve service reliability. For instance, to measure cell edge, the UE can use received signal code power (RSCP) metric (or its component metrics such as receive automatic gain control (RxAGC), common pilot channel (CPICH) Ec/Io separately), and determine that the UE is at a cell edge when the metric goes below a certain threshold. Also, it is noted that the NACKs (for any radio bearer) can be more important than CQIs because most Node Bs extrapolate CQIs from the last successfully received values, but NACK to ACK conversion can be costlier than loss of CQI values.

In another aspect of the disclosure, from the time an SRB message is received, one or more corresponding NACKs will be boosted for a duration of the time. For instance, this may be applied in the case where an L2 ACK is missing in the downlink (DL) for the uplink (UL) SRB (e.g., a reconfiguration complete message).

Additionally, it is noted that even if some of the above options are not practiced, and as a result sometimes a small transmission block size PS Traffic NACK may be boosted, such a NACK boost may have favorable consequences for the application layer.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications operable at a user equipment (UE), comprising:
   operating the UE in a minimum set enhanced uplink dedicated channel (E-DCH) transport format combination (E-TFC) mode, a minimum set transport format combination (TFC) mode, or both the minimum set E-TFC mode and minimum set TFC mode in a multiple radio access bearers (multi-RAB) mode in a transmission time interval (TTI);
   determining that first data is scheduled for transmission in an uplink high speed dedicated physical control channel (HS-DPCCH) in the TTI;
   determining that second data is scheduled for transmission in an uplink data channel in the TTI; and
   forgoing building the second data for transmission during the TTI, if the UE would be transmit-power limited in the TTI when transmitting the first data and second data concurrently while operating in the minimum set E-TFC mode, the minimum set TFC mode, or both the minimum set E-TFC mode and minimum set TFC mode in the multi-RAB mode.

2. The method of claim 1, wherein the uplink data channel comprises at least one of an uplink dedicated channel (DCH) or an enhanced uplink DCH (E-DCH).

3. The method of claim 1, wherein the first data comprises at least one of a channel quality indicator (CQI) or a hybrid automatic repeat request (HARQ) acknowledgement (ACK) or negative ACK for data received in an earlier TTI.

4. The method of claim 1, further comprising:
   transmitting third data on a dedicated physical control channel (DPCCH) in the same TTI,
   wherein the third data comprises a first portion transmitted at a first power level and a second portion transmitted at a second power level that is less than the first power level by a predetermined amount; and
   increasing transmission power of a portion of the first data by the predetermined amount.

5. The method of claim 4, wherein the second portion of the third data comprises non-pilot bits.

6. The method of claim 4, wherein a sum of the transmission power of the portion of the first data and the second portion of the third data is less than or equal to a maximum transmit power limit of the UE.

7. The method of claim 1, further comprising:
   transmitting a first portion of the first data in the TTI at a first power level; and
   transmitting a second portion of the first data in the TTI at a second power level that is less than the first power level, wherein the first data comprises a hybrid automatic repeat request (HARQ) acknowledgement (ACK) or negative ACK for data received in an earlier TTI.

8. An apparatus for wireless communications, comprising:
means for operating the apparatus in a minimum set enhanced uplink dedicated channel (E-DCH) transport format combination (E-TFC) mode in the TTI, a minimum set transport format combination (TFC) mode, or both the minimum set E-TFC mode and minimum set TFC mode in a multiple radio access bearers (multi-RAB) mode in a transmission time interval (TTI);
means for determining that first data is scheduled for transmission in an uplink high speed dedicated physical control channel (HS-DPCCH) in the TTI;
means for determining that second data is scheduled for transmission in an uplink data channel in the TTI; and
means for forgoing building the second data for transmission during the TTI if the apparatus would be transmit-power limited in the TTI when transmitting the first data and second data concurrently while operating in the minimum set E-TFC mode, the minimum set TFC mode, or both the minimum set E-TFC mode and minimum set TFC mode in the multi-RAB mode.

9. The apparatus of claim 8, wherein the uplink data channel comprises at least one of an uplink dedicated channel (DCH) or an enhanced uplink DCH (E-DCH).

10. The apparatus of claim 8, wherein the first data comprises at least one of a channel quality indicator (CQI) or a hybrid automatic repeat request (HARQ) acknowledgement (ACK) or negative ACK for data received in an earlier TTI.

11. The apparatus of claim 9, further comprising:
means for transmitting third data on a dedicated physical control channel (DPCCH) in the same TTI,
wherein the third data comprises a first portion transmitted at a first power level and a second portion transmitted at a second power level that is less than the first power level by a predetermined amount; and
means for increasing transmission power of a portion of the first data by the predetermined amount.

12. The apparatus of claim 11, wherein the second portion of the third data comprises non-pilot bits.

13. The apparatus of claim 11, wherein a sum of the transmission power of the portion of the first data and the second portion of the third data is less than or equal to a maximum transmit power limit of the UE.

14. A non-transitory computer-readable medium comprising code for operating a user equipment (UE), the code comprises:
operating the UE in a minimum set enhanced uplink dedicated channel (E-DCH) transport format combination (E-TFC) mode, a minimum set transport format combination (TFC) mode, or both the minimum set E-TFC mode and minimum set TFC mode in a multiple radio access bearers (multi-RAB) mode in a transmission time interval (TTI);
determining that first data is scheduled for transmission in an uplink high speed dedicated physical control channel (HS-DPCCH) in the TTI;
determining that second data is scheduled for transmission in an uplink data channel in the TTI; and
forgoing building the second data for transmission during the TTI if the UE would be transmit-power limited in the TTI when transmitting the first data and second data concurrently while operating in the minimum set E-TFC mode, the minimum set TFC mode, or both the minimum set E-TFC mode and minimum set TFC mode in the multi-RAB mode.

15. The non-transitory computer-readable medium of claim 14, wherein the uplink data channel comprises at least one of an uplink dedicated channel (DCH) or an enhanced uplink DCH (E-DCH).

16. The non-transitory computer-readable medium of claim 14, wherein the first data comprises at least one of a channel quality indicator (CQI) or a hybrid automatic repeat request (HARD) acknowledgement (ACK) or negative ACK for data received in an earlier TTI.

17. The non-transitory computer-readable medium of claim 16, wherein the code further comprises:
transmitting third data on a dedicated physical control channel (DPCCH) in the same TTI,
wherein the third data comprises a first portion transmitted at a first power level and a second portion transmitted at a second power level that is less than the first power level by a predetermined amount, and
increasing transmission power of a portion of the first data by the predetermined amount.

18. The non-transitory computer-readable medium of claim 17, wherein the second portion of the third data comprises non-pilot bits.

19. The non-transitory computer-readable medium of claim 17, wherein a sum of the transmission power of the portion of the first data and the second portion of the third data is less than or equal to a maximum transmit power limit of the UE.

20. An apparatus for wireless communication, comprising:
at least one processor;
a communication interface coupled to the at least one processor; and
a memory coupled to the at least one processor,
wherein the at least one processor is configured by executable code stored at the memory to:
operate the apparatus in a minimum set enhanced uplink dedicated channel (E-DCH) transport format combination (E-TFC) mode, a minimum set transport format combination (TFC) mode, or both the minimum set E-TFC mode and minimum set TFC mode in a multiple radio access bearers (multi-RAB) mode in a transmission time interval (TTI);
determine that first data is scheduled for transmission in an uplink high speed dedicated physical control channel (HS-DPCCH) in the TTI;
determine that second data is scheduled for transmission in an uplink data channel in the TTI; and
forgo building the second data for transmission during the TTI if the apparatus would be transmit-power limited in the TTI when transmitting the first data and second data concurrently while operating in the minimum set E-TFC mode, the minimum set TFC mode, or both the minimum set E-TFC mode and minimum set TFC mode in the multi-RAB mode.

21. The apparatus of claim 20, wherein the uplink data channel comprises at least one of an uplink dedicated channel (DCH) or an enhanced uplink DCH (E-DCH).

22. The apparatus of claim 20, wherein the uplink data comprises at least one of a channel quality indicator (CQI) or a hybrid automatic repeat request (HARQ) acknowledgement (ACK) or negative ACK for data received in an earlier TTI.

23. The apparatus of claim 20, wherein the processor is further configured to:

transmit third data on a dedicated physical control channel (DPCCH) in the same TTI,
wherein the third data comprises a first portion transmitted at a first power level and a second portion transmitted at a second power level that is less than the first power level by a predetermined amount; and
increase transmission power of a portion of the first data by the predetermined amount.

24. The apparatus of claim 23, wherein the second portion of the third data comprises non-pilot bits.

25. The apparatus of claim 23, wherein a sum of the transmission power of the portion of the first data and the second portion of the third data is less than or equal to a maximum transmit power limit of the apparatus.

26. The apparatus of claim 20, wherein the processor is further configured to:
   transmit a first portion of the first data in the TTI at a first power level; and
   transmit a second portion of the first data in the TTI at a second power level that is less than the first power level,
   wherein the first data comprises a hybrid automatic repeat request (HARQ) acknowledgement (ACK) or negative ACK for data received in an earlier TTI.

* * * * *